3,078,311
Patented Feb. 19, 1963

3,078,311
CATALYTIC PROCESS FOR PREPARING ORGANO-BORON COMPOUNDS FROM DIBORANE
Herbert C. Brown, 1840 Garden St., West Lafayette, Ind.
No Drawing. Filed Jan. 21, 1960, Ser. No. 3,975
12 Claims. (Cl. 260—606.5)

This invention relates to a process for the preparation of organoboron compounds by the reaction of diborane, $B_2H_6$ with an unsaturated organic compound, and is more particularly concerned with improving the reaction time and yields obtainable therein by conducting the reaction in liquid phase and in the presence of a catalyst.

Organoboron compounds which can be made by the process of the present invention are known compounds, which have been previously prepared by various methods, as for example, that described in my co-pending application Serial Number 637,615 filed February 1, 1957, now Patent No. 2,925,438.

Trialkylborons have previously been prepared by the action of alkylmagnesium halides on boron halides in ether solution. Thus, triethylboron had been prepared by the reaction of ethylmagnesium bromide on boron trifluoride in diethyl ether as solvent Meerwein, Hinz, Majert and Sonke, J. prakt. Chem., 147, 240 (1936). The reaction is illustrated by the equations:

$$C_2H_5Br + Mg \rightarrow C_2H_5MgBr$$

$$3C_2H_5MgBr + BF_3 \rightarrow (C_2H_5)_3B + 3MgBrF$$

This procedure has a number of disadvantages. It must be carried out in an ether as solvent and it requires a number of intermediates, such as ethyl bromide, magnesium and boron trifluoride. Moreover, the reaction involves the formation of a by-product, such as MgBrF, which must be recovered for the economic production of trialkylborons.

R. S. Brokaw and R. N. Pease [J. Am. Chem. Soc., 72, 3237 (1950; ibid., 72, 5263 (1950)] have reported that gaseous olefins, such as ethylene, propylene and 1-butene, react with aluminum borohydride at 140 degrees. The reaction is postulated to be:

$$Al(BH_4)_3 + 4\ C_2H_4 \rightarrow (C_2H_5)_3B + C_2H_5Al(BH_4)_2$$

$$C_2H_5Al(BH_4)_2 \rightarrow 7C_2H_4 \rightarrow 2(C_2H_5)_3B + \tfrac{1}{2}(C_2H_5)_4Al_2H_2$$

This method offers considerable advantage over the Grignard route in that it utilizes olefins instead of the more expensive alkyl halide. However, aluminum borohydride is a difficult material to handle, sensitive to water and reacting with explosive violence with air. Aluminum borohydride is also of limited stability above 75 degrees, yet the reaction requires elevated temperatures in the neighborhood of 140 degrees.

In a co-pending application (Herbert C. Brown, Serial No. 630,017, filed December 24, 1956, now abandoned), it was discovered that aluminum borohydride complexed with ethers and similar donor molecules may be used to convert olefins into organoborons. The reaction is:

$$9RCH=CH_2 + (C_2H_5)_2O:Al(BH_4)_3 \rightarrow$$
$$(C_2H_5)_2O + AlH_3 + 3(RCH_2CH_2)_3B$$

Not only are these etherates much more stable than aluminum borohydride itself, but they are less volatile, less inflammable, and much more easily handled. The aluminum borohydride may be formed in situ by treating the aluminum hydride with diborane.

In a copending application (Herbert C. Brown, Serial No. 619,355, filed October 30, 1956, now Patent No. 2,925,437) the preparation of organoboranes is described using the reaction of olefins with solutions of alkali metal borohydrides with polyvalent metal halides. Thus, 1-octene reacts with sodium borohydride and aluminum chloride in solution in the dimethyl ether of diethylene glycol:

$$9RCH=CH_2 + 3NaBH_4 + AlCl_3 \rightarrow$$
$$3NaCl + AlH_3 + 3(RCH_2CH_2)_3B$$

More recently the boron halides have been discovered to bring about this reaction (Herbert C. Brown, Serial No. 637,615, filed February 1, 1957, now Patent No. 2,925,438):

$$12RCH=CH_2 + 3NaBH_4 + BCl_3 \rightarrow$$
$$3NaCl + 4(RCH_2CH_2)_3B$$

By far the most economical method of producing organoborons would be the reaction of olefins or other unsaturated organic compounds with diborane.

$$6RCH=CH_2 + B_2H_6 \rightarrow 2(RCH_2CH_2)_3B$$

However, the available knowledge has indicated that, until the present invention, this would not be a practical synthesis.

Thus, Hurd [J.( Am. Chem. Soc., 70, 2053 (1948)] has reported that the reaction of diborane with olefinic hydrocarbons required heating of the two reactants under pressure in sealed tubes at elevated temperatures for extended periods of time. Thus, a mixture of triisobutylboron and tri-t-butylboron was obtained by the reaction of isobutylene and diborane in a sealed tube at 100 degrees for 24 hours. Reaction of ethylene with diborane at 100 degrees for 96 hours produced triethylboron.

A. T. Whatley and R. N. Pease [J. Am. Chem. Soc., 76, 835 (1954)] studied the reaction of olefins with diborane at elevated temperatures. They found the reaction to be relatively slow and the kinetics were complicated.

It is well known that the introduction of certain electronegative groups, such as $-C_6H_5$ and $-CN$ can greatly activate the double bond. Thus, simple olefins, such as ethylene and propylene cannot be polymerized in the absence of catalysts, whereas styrene, $$C_6H_5CH=CH_2$$

and acrylonitrile, $CH_2=CHCN$, are readily polymerized by heating. Consequently, it is not unexpected that Stone and Emeleus [J. Am. Chem. Soc., 2765 (1950)] observed that styrene will react slowly with diborane at room temperature with a reaction time of 20 hours. Stone and Graham also attempted to react diborane with tetrafluoroethylene [Chemistry and Industry, 1181 (1955)]. However, the reaction did not proceed with addition of the boron hydride to the double bond.

In my co-pending application Serial No. 680,933, filed August 29, 1957, now abandoned, is described and claimed my unexpected finding that tri-saturated hydrocarbylborons can be prepared by the addition reaction of diborane and a mono-ethylenically unsaturated hydrocarbon by conducting the reaction in liquid phase. Reaction time is on the order of 4–12 hours. The invention of the present application is applicable to a broader class of unsaturated organic compounds and cuts down reaction time appreciably.

It has now been discovered, and is herein first disclosed that diborane can be added to an olefinic organic compound within a comparatively short time and within a wide temperature range providing that a liquid phase is maintained in which the reaction may proceed, and providing further that a catalyst is present, said catalyst being a weak Lewis base of the type capable of forming unstable complexes with Lewis acids such as diborane and boron fluoride. The catalyst may be present in comparatively small amounts, even as a trace.

The term "olefinic" as used herein is intended to refer to organic compounds which owe their unsaturation to the presence of one or more carbon to carbon double bonds. In the sense in which this term is used herein, aromatic rings, such as benzene and toluene, and alicyclic rings, such as cyclohexane, are not "unsaturated" and may be present in the olefinic compound as inert substituents.

The method of the present invention is applicable broadly for conversion to organoboron compounds of olefins such as: ethylene, propylene, cis- and trans-2-butene, 1-butene, 1-pentene, 2-pentene, 3-hexene, octenes, 1-diisobutylene, trimethylethylene, tetramethylethylene, decenes, 1-tetradecene, 1-octadecene; of cyclic olefins such as: cyclopentene, cyclohexene, cycloheptene, pinene; of substituted olefins such as: 1,1-diphenylethylene, p-nitrostyrene, p-carbethoxystyrene, styrene, 2-methylstyrene, methylmethacrylate, m-nitrostyrene, alpha-methylstyrene, beta-beta-diphenylethylene, nitroethylene, allylethylether, vinylbutyl ether; and of dienes such as butadiene and cyclohexadiene. The olefinic organic compounds may bear certain functional groups which are not significantly reduced by diborane under the reaction conditions. Thus, the term "olefinic organic compound" also includes nitro olefins, halo olefins (e.g. allyl chloride), olefinic ethers such as the alkenyl alkyl ethers, olefinic acid chlorides, olefinic carboxylic esters (e.g. alkyl esters of alkenyl carboxylic acids such as ethyl oleate), olefinic borate esters, etc.

To illustrate the type of materials which may be used as catalysts the following list is offered, but it should be understood that the list is illustrative only and is not to be construed as limiting:

(A) Ethers, particularly saturated ethers such as the alkyl ethers, e.g. ethyl ether, diglyme

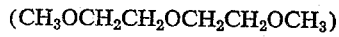

$(CH_3OCH_2CH_2OCH_2CH_2OCH_3)$ diisopropyl ether, diamyl ether, diethyl ether of diethylene glycol, dimethoxyethane, and the like; saturated cyclic ethers such as tetrahydrofuran, dioxane, etc.; and aromatic ethers such as anisole, phenetole, and the like.

(B) Organic esters such as alkyl esters of alkanoic acids or aromatic acids, e.g. ethyl acetate, ethyl benzoate.

(C) Inorganic esters such as the alkyl borates and silicates, e.g. trimethyl borate $[B(OCH_3)_3]$, triethyl borate, triisopropyl borate, ethyl silicate.

(D) Sulfur derivatives such as the alkyl sulfides and sulfones, e.g. ethyl sulfide, methyl ethyl sulfide, diethyl sulfone, tetrahydrothiophene.

(E) Nitro derivatives such as the nitro alkyl and nitro aryl compounds, e.g. nitromethane, nitrobenzene.

As can be seen from the above list, the materials which can be used as catalysts in the present invention are weak donor molecules or weak Lewis bases which are capable of forming unstable complexes or addition compounds with Lewis acids such as diborane and boron fluoride. While any group VI atom could be present in the weakly basic organic compound catalyst, preferably the catalyst will contain oxygen or sulfur. Even water or alcohols can be used as a catalyst, but they react with diborane to form boric acid or boric acid esters and hydrogen and thus involve a loss of diborane.

The catalytic reaction of the present invention requires both the presence of a catalyst and a liquid phase in which the reaction may occur. This liquid phase may be (1) a solvent which is inert under the reaction conditions, e.g. hydrocarbon solvents which can be aliphatic, aromatic or halogenated such as pentane, heptane, petroleum hydrocarbon solvents, benzene, toluene, xylene, chlorobenzene, ethylene dichloride, etc., or (2) the starting olefin itself, where it remains liquid under the reaction conditions, or (3) a previously prepared portion of the desired organoboron product to be produced, or (4) an absorbed liquid phase such as that which exists when a gaseous olefin (e.g. ethylene and propylene) is absorbed on an inert solid having a large surface area (e.g. silica gel, alumina, activated charcoal), or (5) the catalyst itself (in which even no other liquid phase is required, although others may be present).

The catalyst may be introduced into the reaction mixture with either of the reactants i.e., it may be passed in with the diborane gas or it may be admixed with the olefin.

In the catalytic reaction of the instant invention, temperature is not a critical factor and can be varied from 0 degrees centigrade or below to 100 degrees centigrade or higher, always provided that a liquid phase is maintained in which the reaction may proceed. The catalytic reaction is remarkably fast and usually quantitative especially with simple olefins and cycloolefins, with reaction times as low as 5–10 minutes or even less being possible. The only apparent controlling factor in the reaction rate is the speed with which the reactants can be mixed and the rate with which the heat of the reaction can be dissipated.

With simple olefins and cycloolefins, i.e., those which are not highly hindered, the catalytic reaction with diborane in liquid phase results in formation of the trialkylboron and tricycloalkylboron compound. With highly hindered olefins i.e., those which contain large bulky group adjacent the double bond, e.g. 2-diisobutylene, the dialkylborine $R_2BH$ is formed rapidly, and the further reaction to the trialkylboron $R_3B$ is relativly slow.

With alkadienes the organoboron compound formed still retains some unsaturation, but both hydrogen and boron are added to the starting unsaturated molecule.

The following examples will more particularly illustrate the catalytic process of the present invention, but are not to be construed as limiting the invention thereto.

EXAMPLE I

The apparatus used (in this and the following examples also) was a dry 500 milliliter round bottomed flask fitted with an all glass gas dispersion tube and an outlet so that the system could be completely closed to outside atmosphere. The exit gas outlet was connected to a mercury bubbler and then bubbled into anhydrous acetone so that the unreacted diborane, if any, was reacted with acetone. No separate stirring was used since vigorous bubbling of diborane gas through the liquid phase caused sufficient mixing of the reactants. The apparatus was flushed with dry nitrogen before being connected to a source of diborane.

(A) *Preparation of Tri-n-Hexylboron*

Using the above apparatus, carefully purified diborane gas was passed into 50.4 grams (0.6 mole) of 1-hexene at room temperature. Absorption of the stoichiometrically required amount of diborane (0.10 mole) occurred and was complete in about 10 hours. Upon fractional distillation of the contents of the reaction flask at reduced pressure, an almost quantitative yield of tri-n-hexylboron, boiling point 185–188 degrees centigrade/30 mm. was obtained.

The above procedure was then repeated in the presence of 200 milliliters of a catalyst, diglyme (dimethyl ether of diethylene glycol). The catalyst was introduced into the round bottom flask together with the 1-hexene. When the diborane was passed into the reaction mixture, the reaction vessel became appreciably warm due to the vigorous reaction between the olefin and diborane, so the flask was cooled with running water thus maintaining reaction temperature at about 25–30 degrees centigrade. The reaction time was very fast, and all the diborane disappeared within about 5 minutes. Upon distillation of the contents of the reaction flask, an almost quantitative yield of tri-n-hexylboron was obtained.

The above procedure was repeated a number of times using the following catalysts: ethyl ether, tetrahydrofuran, tetrahydropyran, dimethyl ether of triethylene glycol, ethyl acetate, and nitrobenzene. Due to the decreased solubility of diborane in some of these catalytic solvents, the diborane was bubbled in at a slower rate and reaction time was extended to about an hour. Various reaction temperatures varying from ice-temperature to steam bath temperatures were employed. In each case, almost quantitative yields of tri-n-hexylboron were obtained by fractional distillation under reduced pressure of the contents of the reaction flask.

The reaction between diborane and 1-hexene was then repeated using only two milliliters of the catalyst (in one case, tetrahydrofuran, and in another experiment, diglyme) and even this small amount of catalyst was found sufficient to complete the reaction within about 5 minutes. Again an almost quantitative yield of tri-n-hexylboron was obtained.

(B) *Preparation of Tricyclohexylboron*

Using the procedure of the preceding examples 0.10 mole of diborane was reacted with 0.6 mole of cyclohexene. Reaction time was about 3 hours, and upon fractional distillation an almost quantitative yield of tricyclohexylboron was obtained, boiling point 130–132 degrees centigrade/2 mm.

The above procedure was repeated a number of times each time in the presence of a catalyst. The following catalysts were used: 100 milliliters of diglyme, 100 milliliters of tetrahydrofuran, 50 milliliters of ethyl ether, 200 milliliters of ethyl benzoate, 200 milliliters of ethyl silicate, 100 milliliters of methyl borate, 150 milliliters of diethyl sulfide. Again, a wide range of reaction temperatures was used. Reaction times varied from about 10–60 minutes, and in each case, an over 90 percent yield of tricyclohexylboron was obtained.

(C) *Conversion of Butadiene*

Using the same apparatus and procedures of the preceding examples butadiene (0.1 mole) was dissolved in 100 milliliters of dimethyl ether of diethylene glycol (which served both as the liquid phase and as the catalyst). Diborane (0.017 mole) was passed into the butadiene solution and the reaction mixture was maintained at 0 degree centigrade, for about an hour. The mixture was fractionated to remove the solvent and an oily residue was left, weighting about 15 grams. This residue which was the butadiene-diborane addition product, reacted rapidly with oxygen (indicating the presence of boron in the molecule) and with bromine (indicating that there still was some unsaturation in the compound).

(D) *Conversion of Ethyl Oleate*

Following the procedure of Example C above, but using ethyl oleate in place of butadiene and a reaction temperature of 75 degrees centigrade for a few minutes, there was obtained an almost quantitative yield of conversion product as an oily liquid which could not be distilled and which exhibited no unsaturation. It was concluded that a boron-hydrogen link must have reacted with the double bond to form a boron compound.

(E) *Conversion of Allyl Chloride*

Following the procedure of Example C above, but using allyl chloride in place of butadiene, the product was obtained as an oily liquid which contained both chlorine and boron, and which was not unsaturated.

EXAMPLE II

*Preparation of Tri-n-Butylboron Using Adsorbed Liquid Phase*

Using the apparatus of Example I, 100 grams of finely divided activated charcoal were placed in the reaction flask. Then 0.6 mole of 1-butene gas and 0.10 mole of pure diborane gas were slowly passed into the reaction vessel under slight pressure. The reaction period was about 6 hours. The reaction product, tri-n-butylboron was recovered in over 75 percent yield by extracting the activated charcoal and contents of the reaction flask with ether, followed by distillation.

The above was then repeated except that the diborane gas used was bubbled through diglyme to saturate the gas with this catalyst.

The reaction period was under one hour, and an over 75 percent yield of tri-n-butylboron was recovered.

Similar results were obtained for making tri-n-propylboron from propylene, and triethylboron from ethylene.

EXAMPLE III

*Preparation of Tri-n-Octylboron*

Using the apparatus of the preceding examples, 0.6 mole of 1-octene and 100 milliliters of n-heptane were placed in the round bottom flask. Then 0.10 mole of pure diborane was passed into the reaction flask, which was maintained at about 25–30 degrees centigrade. Reaction time was about 9 hours, after which fractional distillation of the reaction flask contents resulted in recovery of over 80 percent of the theoretical yield of tri-n-octylboron, boiling point 144–146 degrees centigrade/2 mm.

The above experiment was repeated, with about 1 milliliter of catalyst, ethyl ether, being added to the n-heptane solvent. Reaction time was under 10 minutes and a similar yield of tri-n-octylboron was obtained.

The experiment was again repeated with the catalyst being traces of diglyme which was carried over from the generation of the diborane gas. Reaction time was under 10 minutes, and over 80 percent of the theoretical yield of tri-n-octylboron product was obtained.

Similar results were obtained using 3-octene with benzene as the solvent, and using 1-tetradecene with toluene as the solvent. In each case reaction time was cut from over 9 hours without a catalyst to under one hour with a catalyst.

The above procedure (using about 1 milliliter of tetrahydrofuran as the catalyst) was repeated with styrene, alpha-methyl-styrene and beta, beta-diphenylethylene (using n-heptane as the liquid phase). In all cases 80–90 percent yields of the corresponding $R_3B$ compound (wherein R is the ethylenically saturated analogue of the ethylenically unsaturated starting compound) were obtained in under 30 minutes.

EXAMPLE IV

*Tri-n-Hexylboron*

Using the apparatus and procedure of the previous examples, 50 milliliters of tri-n-hexylboron (previously prepared in an earlier batch by the procedure of Example I) and 50.4 grams (0.6 mole) of 1-hexene were placed in the reaction flask and reacted with 0.10 mole of pure diborane gas over about a nine hour period, at a reaction temperature of about 25–30 degrees centigrade. Fractional distillation resulted in the recovery of the starting tri-n-hexylboron plus over 85 percent of the theoretical yield of the tri-n-hexylboron product procedure.

The above experiment was repeated using a catalyst (20 milliliters of tetrahydrofuran which was added to the reaction flask with the starting tri-n-hexylboron solvent). Reaction time was cut to under 20 minutes and over 85 percent of the yield of product was obtained.

The above procedures were repeated using 1-octene with previously prepared tri-n-octylboron as the liquid phase and a reaction temperature of about 95 degrees centigrade. Without a catalyst, reaction time to make tri-n-octylboron in over 85 percent yield was about 8 hours. With a catalyst (20 milliliters of nitrobenzene) reaction time for a similar yield was cut to under 20 minutes. The catalytic procedure was repeated at ice-temperatures and reaction time was still under 20 minutes.

EXAMPLE V

Catalyst As Liquid Phase

Using the apparatus and procedure of the preceding examples, 0.10 mole of diborane gas was passed into 50.4 grams (0.6 mole) of 1-hexene in 200 milliliters of tetrahydrofuran over a period of about 15 minutes during which the reaction vessel was cooled with running water to maintain a reaction temperature of about 25–30 degrees centigrade. Tri-n-hexylboron was obtained almost in quantitative yield by fractional distillation.

In the same manner, when 2-hexene, 4-decene, 1-octadecene were each substituted for 1-hexene in the above experiment, tri-sec-hexylboron, tridecylboron and trioctadecylboron were respectively obtained.

It is to be understood that the invention is not to be limited to the exact details of operation or exact compounds shown and described, as obvious modificaions and equivalents will be apparent to one skilled in the art, and the invention is therefore to be limited only by the scope of the appended claims.

This application is a continuation-in-part of my co-pending application Serial No. 680,934, filed August 29, 1957.

I claim:

1. In the process for preparing an organoboron compound by the reaction of diborane with a co-reactive quantity of an unsaturated organic compound selected from the group consisting of olefins, cyclic olefins, nitro olefins, halo olefins, alkenyl alkyl ethers, and alkyl esters of alkenyl carboxylic acids, the improvement which includes conducting said reaction (1) in a liquid phase and in the presence of a weak liquid Lewis base catalyst capable of forming unstable complexes with diborane and selected from the group consisting of alkyl ethers, saturated cyclic ethers, aromatic ethers, alkyl esters of alkanoic acids, alkyl esters of aromatic acids, alkyl borates, alkyl silicates, alkyl sulfides, alkyl sulfones, and nitro alkyl and nitro aryl compounds; and (2) at a temperature of from about 0 degree centigrade to 100 degrees centigrade and at a pressure not substantially above atmospheric pressure.

2. The process of claim 1 wherein the liquid phase is an inert solvent.

3. The process of claim 1 wherein the liquid phase is a previously prepared portion of the desired organoboron compound, and wherein the organoboron compound which forms is withdrawn at a rate equal to that at which the initial reactants are added.

4. The process of claim 1 wherein the liquid phase is the same compound as the unsaturated organic compound.

5. The process of claim 1 wherein the liquid phase is an adsorbed liquid phase consisting of the gaseous unsaturated organic compound adsorbed on an inert solid having a large surface area.

6. The process of claim 1 wherein the reaction time is less than about 2 hours.

7. The process of forming tri-n-hexylboron which comprises passing diborane into a co-reactive quantity of 1-hexene in the liquid phase and in the presence of at least a trace of a weak liquid Lewis base catalyst capable of forming unstable complexes with diborane and selected from the group consisting of alkyl ethers, saturated cyclic ethers, aromatic ethers, alkyl esters of alkanoic acids, alkyl esters of aromatic acids, alkyl borates, alkyl silicates, alkyl sulfides, alkyl sulfones, and nitro alkyl and nitro aryl compounds, the reaction system being maintained at a temperature of from about 0 degree centigrade to 100 degrees centigrade and at a pressure not substantially above atmospheric pressure.

8. The process of claim 7 wherein the catalyst is tetrahydrofuran.

9. The process of claim 1 wherein said Lewis base catalyst is an alkyl ether.

10. A process which comprises passing diborane into 1-hexene in the liquid phase and in the presence of at least a trace of a liquid alkyl ether to form tri-n-hexylboron.

11. The process of claim 10 wherein the catalyst is dimethyl ether of diethylene glycol.

12. The process of claim 10 wherein the catalyst is ethyl ether.

References Cited in the file of this patent

UNITED STATES PATENTS

| | | |
|---|---|---|
| 2,446,008 | Hurd | July 27, 1948 |
| 2,685,575 | Heiligmann et al. | Aug. 3, 1954 |
| 2,983,760 | Ryschkewitsch | May 9, 1961 |